United States Patent [19]

Sun

[11] Patent Number: 4,959,416

[45] Date of Patent: Sep. 25, 1990

[54] POLYMERIC BLEND COMPOSITION

[75] Inventor: Yun C. Sun, Midland, Mich.

[73] Assignee: The Dow Chemical Company, Midland, Mich.

[21] Appl. No.: 352,622

[22] Filed: May 15, 1989

Related U.S. Application Data

[63] Continuation-in-part of Ser. No. 45,748, May 4, 1987, abandoned, which is a continuation-in-part of Ser. No. 809,360, Dec. 16, 1985, abandoned.

[51] Int. Cl.$^5$ .................. C08L 27/08; C08L 35/02
[52] U.S. Cl. .................................. 525/222; 525/221; 525/238; 525/239
[58] Field of Search ............... 525/317, 301, 302, 239, 525/238, 222, 221

[56] References Cited

U.S. PATENT DOCUMENTS 4,143,011  3/1979  Hisazumi et al. .................. 525/317

Primary Examiner—Jacob Ziegler
Attorney, Agent, or Firm—Thomas D. Zindrick

[57] ABSTRACT

A polymeric blend composition comprising a vinylidene chloride interpolymer, a copolymer of a monovinylidene aromatic monomer and methyl methacrylate, and, optionally, a polymer formed from one or more monovinylidene aromatic monomers. The polymeric blend compositions of the present invention have been found to possess excellent impact strength and sufficient melt strength and rigidity to be thermoformable.

10 Claims, No Drawings

POLYMERIC BLEND COMPOSITION

CROSS-REFERENCE TO RELATED APPLICATION

This application is a Continuation-in-Part of application Ser. No. 045,748, filed May 4, 1987, now abandoned, which is a Continuation-in-Part of application Ser. No. 809,360, filed Dec. 16, 1985, now abandoned.

BACKGROUND OF THE INVENTION

This invention relates to a polymeric blend composition. Specifically, it relates to a blend of a vinylidene chloride interpolymer, a copolymer of a monovinylidene aromatic monomer and methyl methacrylate, and, optionally, a polymer formed from one or more monovinylidene aromatic monomers.

Vinylidene chloride interpolymers are well-known in the prior art. Vinylidene chloride interpolymers are desirable for use in applications requiring low permeability to oxygen and other atmospheric gases. However, several of the applications for which vinylidene chloride interpolymers would be ideal because of their low permeability to oxygen require that materials suitable for such uses be capable of being thermoformed. As a general rule, vinylidene chloride interpolymers cannot be thermoformed because they possess inadequate melt strength and rigidity.

Similarly, copolymers of a monovinylidene aromatic monomer and methyl methacrylate are well-known in the prior art. Exemplary of such copolymers is a copolymer formed from styrene and methyl methacrylate. Copolymers of styrene and methyl methacrylate possess the melt strength and rigidity necessary for use in thermoforming processes. However, such copolymers are relatively highly permeable to oxygen and other atmospheric gases.

It would be desirable to produce a polymeric composition possessing good barrier to oxygen and atmospheric gases as well as possessing the melt strength and rigidity necessary to be thermoformed. It is to this goal that the present invention is directed.

Applicant has discovered that a blend of a vinylidene chloride interpolymer and a copolymer of a monovinylidene aromatic monomer and methyl methacrylate possesses improved mechanical properties. That is, such blends exhibit an izod impact strength which is greater than either of the blend components separately. Moreover, Applicant has discovered that a comonomer of a monovinylidene aromatic monomer and methyl methacyrlate when added to a vinylidene chloride interpolymer renders the vinylidene chloride interpolymer thermoformable.

SUMMARY OF THE INVENTION

The present invention concerns a polymeric blend composition comprising:

(a) from about 45 to about 98 weight percent, based on total blend composition weight, of a vinylidene chloride interpolymer having polymerized therein vinylidene chloride in an amount of from about 40 to about 98 percent by weight of interpolymer and at least one monoethylenically unsaturated monomer copolymerizable therewith in an amount of from about 60 to about 2 percent by weight of interpolymer;

(b) from about 2 to about 50 weight percent based on total composition weight, of a copolymer of a monovinylidene aromatic monomer and methyl methacrylate, said copolymer comprising a monovinylidene aromatic monomer in an amount of from about 35 to about 70 percent by weight of copolymer and methyl methacrylate in an amount of from about 30 to about 65 percent by weight of copolymer; and (c) from 0 to about 50 weight percent based on total blend composition weight, of a polymer formed from one or more monovinylidene aromatic monomers.

Additionally, the present invention concerns a container for forming by thermoforming the above described polymeric blend compositions.

DETAILED DESCRIPTION OF THE INVENTION

Vinylidene chloride interpolymers suitable for use in the present invention are those vinylidene chloride interpolymers formed from vinylidene chloride and an amount of one or more monoethylenically unsaturated monomers copolymerizable with vinylidene chloride.

The vinylidene chloride interpolymers have polymerized therein vinylidene chloride in an amount of from about 40 to about 98 weight percent, beneficially from about 50 to about 96 weight percent, and desirably from about 60 to about 94 weight percent, based on total weight of vinylidene chloride interpolymer.

The vinylidene chloride interpolymer comprises one or more monoethylenically unsaturated monomers copolymerizable with vinylidene chloride. The amount of monoethylenically unsaturated monomer is suitably from about 60 to about 2 weight percent, beneficially from about 50 to about 4 weight percent, and desirably from about 40 to about 6 weight percent, based on total weight of vinylidene chloride interpolymer.

Monoethylenically unsaturated monomers suitable for use in the present invention include vinyl chloride, alkyl acrylates, alkyl methacrylates, acrylic acid, methacrylic acid, itaconic acid, acrylonitrile, and methacrylonitrile. The unsaturated monomers are desirably selected from the group consisting of vinyl chloride, alkyl acrylates and alkyl methacrylates, the alkyl acrylates and alkyl methacrylates having from about 1 to about 8 carbon atoms per alkyl group. The alkyl acrylates and alkyl methacrylates preferably have from about 1 to about 4 carbon atoms per alkyl group. The alkyl acrylates and alkyl methacrylates are most preferably selected from the group consisting of methylacrylates, ethylacrylates, and methyl methacrylates.

Methods of forming the vinylidene chloride interpolymer suitable for use in the present invention are well-known in the prior art. The vinylidene chloride interpolymer is generally formed through an emulsion or suspension polymerization process. Exemplary of such processes are U.S. Pat. Nos. 2,558,728; 3,007,903; 3,642,743; 3,879,359; and the methods described by R. A. Wessling, in *Polyvinylidene Chloride*, Gordon and Breach Science Publishers, N.Y., 1977, Chapter 3, all of which are incorporated herein by reference. Typically, the monomeric materials are emulsified or suspended in an aqueous phase. The aqueous phase contains a polymerization initiator and a surface active agent capable of emulsifying or suspending the monomeric materials. The polymerization of the monomeric materials is usually carried out with heating and agitation.

In addition to the vinylidene chloride interpolymer the polymeric blend compositions of the present invention also comprise a copolymer of a monovinylidene aromatic monomer and methyl methacrylate.

Exemplary of monovinylidene aromatic monomers suitable for use in forming the copolymer of monovinylidene aromatic monomer and methyl methacrylate are styrene; alpha-alkyl monovinylidene monomeric compounds (such as alpha-methylstyrene, alpha-ethylstyrene, alpha-methyl vinyl toluene, alpha-methyl dialkyl styrene, etc.); ring-substituted alkyl styrenes (such as, ortho vinyl toluene, meta vinyl toluene, and para vinyl toluene, ortho ethylstyrene, para ethylstyrene, 2,4-dimethylstyrene, paratertiary butylstyrene, etc.); ring-substituted halostyrenes (such as, ortho chlorostyrene, para chlorostyrene, ortho bromostyrene, 2,4-dichlorostyrene, etc.); ring-alkyl, ring-halo substituted styrene (such as, 2-chloro-4-methylstyrene, 2,6-dichloro-4-methylstyrene, etc.); vinyl naphthalene; vinyl anthracene; etc. The alkyl substituents generally have 1 to 4 carbon atoms and may include isopropyl and isobutyl groups. If desired, mixtures of one or more of such monovinylidene aromatic monomers may be used.

Beneficially, the monovinylidene aromatic monomers are selected from the group consisting of styrene, and alpha-methylstyrene. Preferably, the monovinylidene aromatic monomer is styrene.

The copolymer of a monovinylidene aromatic monomer and methyl methacrylate generally has an amount of monovinylidene aromatic monomer and methyl methacrylate effective for the copolymer and the vinylidene chloride interpolymer to be substantially miscible. By "miscible" is meant the ability of a liquid to dissolve uniformly in another liquid. Miscibility of the copolymer may be determined by one of ordinary skill in the art without undue experimentation. One method for determining miscibility is by measuring the optical clarity. Transparency of a blend is directly proportional to the miscibility of the blend components. Generally, blends of the present invention should have a percent of light transmittance (ratio of transmitted light to incident light) of at least 50 percent (%), preferably 60%, and most preferably 70%. For a more detailed discussion of measuring miscibility via light transmittance see *Polymer Blending can Yield Strong Films,* Sun, (August, 1987) Research and Development, the teachings of which are hereby incorporated by reference. Generally, the reference teaches that with increasing compatibility, the domain size of the dispersed phase decreases and clarity improves.

Preferably, the copolymer has polymerized therein a monovinylidene aromatic monomer in an amount of from about 20 to about 80 percent by weight of copolymer, more preferably from about 30 to about 70 percent by weight of copolymer, an most preferably from about 40 to about 60 percent by weight of copolymer. The copolymer also has polymerized therein methyl methacrylate in an amount of from about 80 to about 20 percent, beneficially from about 70 to about 30 percent, and preferably from about 60 to about 40 percent, by weight of copolymer.

Methods of forming the copolymer of the monovinylidene aromatic monomer and methyl methacrylate are well-known in the art. Examples of processes suitable for production of the copolymer are mass, mass-suspension, mass-solution, suspension, and emulsion polymerization processes, as well as other modifications and/or combinations of such processes. See, for example, U.S. Pat. Nos. 3,509,237; 3,928,494; 4,221,883; 4,239,863; 4,243,765; and 4,250,271; which are incorporated herein by reference and teach such processes.

In addition to the vinylidene chloride interpolymer and copolymer of a monovinylidene aromatic monomer and methyl methacrylate, the polymeric blend compositions of the present invention may comprise from 0 to about 50 weight percent, based on total blend composition weight, of a polymer formed from one or more monovinylidene aromatic monomers. The monovinylidene aromatic monomers suitable for forming the polymer formed from one or more monovinylidene aromatic monomers are those monovinylidene aromatic monomers set forth above as being suitable for use in forming the copolymer of a monovinylidene aromatic monomer and methyl methacrylate. Preferably, the polymer formed from a monovinylidene aromatic monomer is formed from styrene, alpha-methylstyrene, or a combination of styrene and alpha-methylstyrene. Most preferably, the polymer formed from one or more monovinylidene aromatic monomers is formed from styrene.

The polymeric blend compositions of the present invention comprises the described vinylidene chloride interpolymer in an amount of from about 45 to about 98 weight percent, desirably from about 60 to about 97 weight percent, and preferably from about 70 to about 90 weight percent, based on total blend composition weight. The blend compositions of the present invention comprise the described copolymer of a monovinylidene aromatic monomer and methyl, methacrylate in an amount of from about 2 to about 70 weight percent, desirable from about 5 to about 60 weight percent, and preferably from about 10 to about 40 weight percent, based on total blend composition weight.

The polymeric blend compositions of the present invention comprise a polymer formed from one or more monovinylidene aromatic monomer in an amount of from 0 to about 50 weight percent, desirably from 0 to about 40 weight percent, preferably from 0 to about 30 weight percent, based on total blend composition weight.

In one embodiment of the present invention wherein the polymer formed from one or more monovinylidene aromatic monomers is not present in the polymeric blend composition, said compositions comprise the vinylidene chloride interpolymer in an amount of from about 40 to about 90 weight percent, preferably from about 50 to about 80 weight percent and the copolymer of a monovinylidene aromatic monomer and methyl methacrylate in an amount of from about 60 to about 10 weight percent, preferably from about 50 to about 20 weight percent, based on total blend composition weight.

In another embodiment of the present invention wherein the polymer formed from one or more monovinylidene aromatic monomers is present in the polymeric blend composition, said composition comprises the vinylidene chloride interpolymer in an amount of from about 40 to about 95 weight percent, preferably from about 50 to about 75 weight percent, the copolymer of a monovinylidene aromatic monomer and methyl methacrylate in an amount of from about 60 to about 2 percent, preferably from about 50 to about 5 weight percent, and the polymer formed from one or more monovinylidene aromatic monomers in an amount of from about 0 to about 30 weight percent, preferably from about 0 to about 20 weight percent, based on total blend composition weight.

The polymeric blend compositions of the present invention are readily prepared using conventional melt processing techniques provided two conditions are met. First, melt processing must be accomplished at a temperature below that at which decomposition of the vinylidene chloride interpolymer becomes significant. Second, sufficient shear must be generated during melt processing to provide a visually homogenous blend within a reasonable mixing time.

Conventional melt processing equipment which may be used includes, heated two roll compounding mills, Brabender mixers, Banbury mixers, single screw extruders, twin screw extruders, and the like. Desirable results are obtained when an extruder, either single screw or twin screw, is used for melt processing the polymeric blend compositions of the present invention.

A variety of additives may be added to the polymeric blend compositions of the present invention. Additive type and amounts thereof will depend upon several factors. One factor is the intended use of the blends. A second factor is tolerance of the blends for the additives, that is, how much additive can be added before the physical properties of the blends are adversely affected to an unacceptable level. Other factors are apparent to those skilled in the art of polymer formulation and compounding Additives which may be incorporated into the polymeric blend compositions of the present invention are illustrated by the following nonlimiting examples, plasticizers, heat stabilizers, light stabilizers, pigments, processing aids, lubricants, and the like. Each of these additives is known and several types of each are commercially available.

Applicant has unexpectedly discovered that blend compositions according to the present invention possess an izod impact strength which is greater than the izod impact strength of any of the blend components taken alone. Moreover, Applicant has discovered that blend compositions according to the present invention possess sufficient melt strength and rigidity to render said blend compositions thermoformable. For these reasons the polymeric blend compositions of the present invention can be used to form a variety of thermoformed articles. Additionally, the blends can be used to form a variety of cast, blown, extruded, molded, injection molded, or calendared articles.

The present invention is illustrated in further detail by the following examples and comparative examples. The examples and comparative examples are for purposes of illustration only and are not to be construed as limiting the scope of the present invention. All parts and percentages are by weight unless otherwise specifically noted.

EXAMPLES AND COMPARATIVE EXAMPLES

Polymeric blend compositions were prepared from the following components.

(A) A vinylidene chloride interpolymer comprising 83 weight percent vinylidene chloride, based on total vinylidene chloride interpolymer weight, and 17 weight percent vinyl chloride based on total vinylidene chloride interpolymer weight. The vinylidene chloride interpolymer has an average molecular weight of 85,000 and contains 1.2 parts per hundred parts vinylidene chloride interpolymer of epoxidized linseed oil and 2 parts per hundred parts vinylidene chloride interpolymer, of tetrasodium pyro phosphate.

(B) A copolymer of styrene and methyl methacrylate comprising 56 weight percent methyl methacrylate, based on total weight of styrene/methyl methacrylate copolymer, and 44 weight percent styrene, based on total weight of styrene/methyl methacrylate copolymer. Commercially available from Richardson Chemicals under the trade designation P205-UV-81.

(C) Polystyrene having a melt flow rate of 4.5.

The above components are blended in various combinations and ratios. The composition of the various blends and the ratios of the components are set forth in Table I.

The blend compositions are formed by melt blending the blend components in a Brabender extruder. The compositions are extruded through a strand die and cut into pellets. The pellets are compression molded into sheets. Physical property testing is performed on said sheets.

TABLE I

| | Component | | | | Thermoform- |
| --- | --- | --- | --- | --- | --- |
| | VDC[1] | S/MMA[2] | PS[3] | Izod[4] | ability[5] |
| Example No. | | | | | |
| 1 | 68 | 6 | 26 | 0.31 | Good |
| 2 | 68 | 13 | 19 | 0.37 | Good |
| 3 | 68 | 32 | 0 | 0.59 | Good |
| Comparative Example No. | | | | | |
| 1 | 68 | 0 | 32 | 0.23 | Poor |
| 2 | 100 | 0 | 0 | 0.26 | Poor |
| 3 | 0 | 100 | 0 | 0.24 | Fair |
| 4 | 0 | 0 | 100 | 0.25 | Good |

[1]Weight percent vinylidene chloride interpolymer, based on total blend composition weight.
[2]Weight percent copolymer of styrene and methyl methacrylate, based on total blend composition weight.
[3]Weight percent polystyrene based on total blend composition weight.
[4]Notched Izod impact strength determined according to American Society for Testing and Materials test method D-256.
[5]Thermoformability, rated as either good, fair, or poor, determined by thermovacuum forming a compression molded sheet.

As can be seen from the above Table, blends according to the present invention possess a notched Izod impact strength greater than the Izod impact strength of any of the blend components taken alone or of a blend of the vinylidene chloride interpolymer and polystyrene. Moreover, the blends of the present invention are thermoformable.

What is claimed is:

1. A polymeric blend composition comprising a visually homogeneous blend of
    (a) from about 45 to about 98 weight percent, based on total blend composition weight, of a vinylidene chloride interpolymer having polymerized therein vinylidene chloride in an amount of from about 40 to about 98 percent by weight of interpolymer and at least one monoethylenically unsaturated monomer copolymerizable therewith in an amount of from about 60 to about 2 percent by weight of interpolymer;
    (b) from about 2 to about 70 weight percent, based on total blend composition weight, of a copolymer which is miscible with the vinylidene chloride interpolymer, said copolymer comprising a monovinylidene aromatic monomer and methyl methacrylate, said copolymer having polymerized therein a monovinylidene aromatic monomer in an amount of from about 20 to about 80 percent by weight of copolymer and a methyl methacrylate in an amount of 80 to about 20 percent by weight of copolymer, wherein the monovinylidene aromatic monomer and methyl methacrylate are each present in an amount effective for the copolymer and the vinylidene chloride interpolymer to be substantially miscible; and (c) from 0 to about 50 weight percent, based on total blend composition weight of a polymer formed from one or more monovinylidene aromatic monomers.

2. The polymeric blend composition of claim 1 wherein the monoethylenically unsaturated monomer copolymerizable with vinylidene chloride is selected from the group consisting of vinyl chloride, alkyl acrylates, alkyl methacrylates, acrylic acid, methacrylic acid, itaconic acid, acrylonitrile, and methacrylonitrile.

3. The polymeric blend composition of claim 2 wherein the monoethylenically unsaturated monomer copolymerizable with vinylidene chloride is present in the vinylidene chloride interpolymer in an amount of from about 6 to about 40 weight, percent, based on total weight of the vinylidene chloride interpolymer.

4. The polymeric blend composition of claim 1 wherein the monovinylidene aromatic monomer present in the copolymer of a monovinylidene aromatic monomer and methyl methacrylate is styrene.

5. The polymeric blend composition of claim 4 and methyl methacrylate comprises styrene in an amount of from about 30 to about 70 percent by weight of copolymer and methyl methacrylate in an amount of from about 70 to about 30 percent by weight of copolymer.

6. The polymeric blend composition of claim 1 wherein the polymer formed from one or more monovinylidene aromatic monomers is a homopolymer of styrene.

7. The polymeric blend composition of claim 1 wherein the vinylidene chloride interpolymer is present in an amount of from about 50 to about 75 weight percent, the copolymer of a monovinylidene aromatic monomer is present in an amount of from about 50 to about 5 weight percent; and the polymer formed from one or more monovinylidene aromatic monomers is present in an amount of from about 0 to about 50 weight percent, based on total weight of the polymeric blend composition.

8. The polymeric blend composition of claim 1 wherein the vinylidene chloride interpolymer is present in an amount of from about 40 to about 90 weight percent; and the copolymer of a monovinylidene aromatic monomer and methyl methacrylate is present in an amount of from about 60 to about 10 weight percent, based on total weight of the polymeric blend composition.

9. A container formed by thermoforming the polymeric blend composition according to claim 1.

10. The polymeric blend composition of claim 1 wherein the copolymer of a monovinylidene aromatic monomer and methyl methacrylate is present in an amount of from 5 to about 50 weight percent, based on the total blend composition weight.

* * * * *